United States Patent [19]
de Jong et al.

[11] 4,409,830
[45] Oct. 18, 1983

[54] WAVE VELOCITY DETECTING SCHEMES FOR TRAVELING WAVE FLOW METER

[75] Inventors: Joannes M. M. de Jong, West Ford; Richard L. Earle, Mendon; Richard K. Somes, Berlin, all of Mass.

[73] Assignee: Sperry Corporation, New York, N.Y.

[21] Appl. No.: 268,940

[22] Filed: Jun. 1, 1981

[51] Int. Cl.³ .............................................. G01F 3/20
[52] U.S. Cl. .................................. 73/269; 73/861.21; 73/DIG. 4
[58] Field of Search ..................... 73/269, 579, 861.18, 73/861.21, 861.24, DIG. 1, DIG. 4

[56] References Cited
U.S. PATENT DOCUMENTS

| 398,013 | 2/1889 | Welker | 73/269 |
| 3,175,399 | 3/1965 | Medlar | 73/861.21 |
| 4,141,246 | 2/1979 | Randolph | 73/861.21 |

Primary Examiner—Charles A. Ruehl
Attorney, Agent, or Firm—Howard P. Terry

[57] ABSTRACT

In a flow meter of the traveling wave type having a flexible undulating membrane, velocity detecting means is utilized to determine the velocity of propagation of the traveling wave associated with the undulating flexible membrane between at least two known locations on the flexible membrane. The velocity of propagation is proportional to the volumetric flow rate of fluid through the flow meter.

8 Claims, 7 Drawing Figures

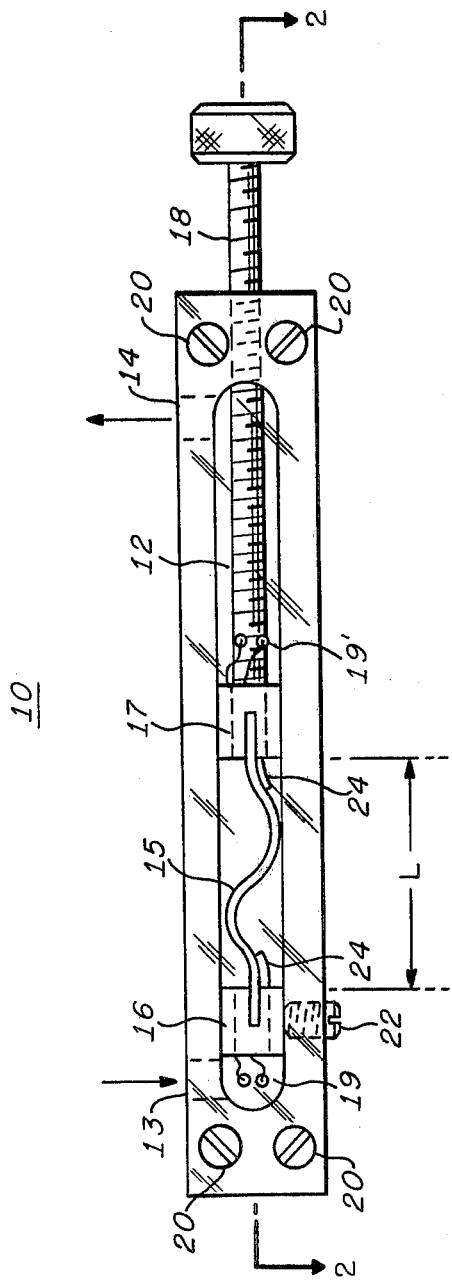
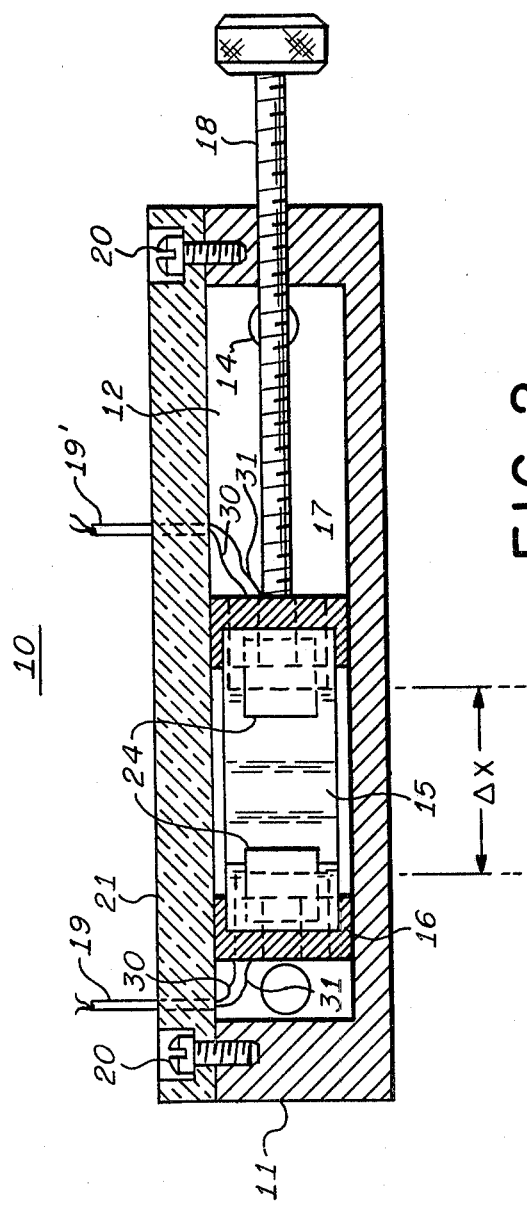
FIG. 1.
FIG. 2.

WAVE VELOCITY DETECTING SCHEMES FOR TRAVELING WAVE FLOW METER

BACKGROUND OF THE INVENTION

1. Field of the Invention

This invention relates to devices for measuring flow rates, and more specifically to a traveling wave flow meter having an undulating flexible membrane, wherein the velocity of propagation of a traveling wave associated with the flexible membrane is a function of volumetric flow.

2. Description of the Prior Art

A traveling wave flow meter having an undulating flexible membrane whose frequency is a function of volumetric flow is described in U.S. Pat. No. 4,358,954, entitled "Traveling Wave Flow Meter", issued Nov. 16, 1982 to Joannes de Jong. The flow meter includes a strip of flexible material having a length X which is forced to occupy a length of channel L, wherein (L−X). As a result, the flexible membrane buckles and assumes a wavelike shape inside the channel. When fluid is forced to flow through the channel, the flexible membrane undulates in a traveling wave type of displacement and the frequency of the traveling wave is a function of the volumetric flow rate of the fluid through the channel.

The response time of the above described traveling wave flow meter is relatively slow, since the response time is dictated by the frequency of the undulating flexible membrane. In interfacing the traveling wave flow meter with electronic processing devices, the relatively slow response time may prove to be particularly disadvantageous. Accordingly, there is a need for a traveling wave flow meter having a relatively fast response time.

SUMMARY OF THE INVENTION

A traveling wave flow meter having a relatively fast response time includes a flexible membrane within a channel and means for detecting the velocity of propagation of a traveling wave associated with the undulating flexible membrane. The velocity of propagation is detected by choosing at least two known locations on the flexible membrane and measuring the distance therebetween as well as measuring the travel time or phase difference of a traveling wave between the known locations. Preferably, either strain gauges or piezoelectric polymer strips are disposed at known locations on the flexible membrane, and as the flexible membrane undulates output signals are generated. Since the distances between the strain gauges or piezoelectric polymer strips are known, the velocity of the traveling wave may be determined by timing and processing the generated output signals. In an alternate embodiment of the present invention, the flexible membrane may be fabricated from a piezoelectric material which is metallized in known locations. Leads coupled to the metallized locations provide the necessary output signals as the flexible piezoelectric membrane undulates.

BRIEF DESCRIPTION OF THE DRAWINGS

FIG. 1 is a plan view of the apparatus of the present invention.

FIG. 2 is a sectional front view of the apparatus of the present invention.

DESCRIPTION OF THE PREFERRED EMBODIMENT

Figure 3:
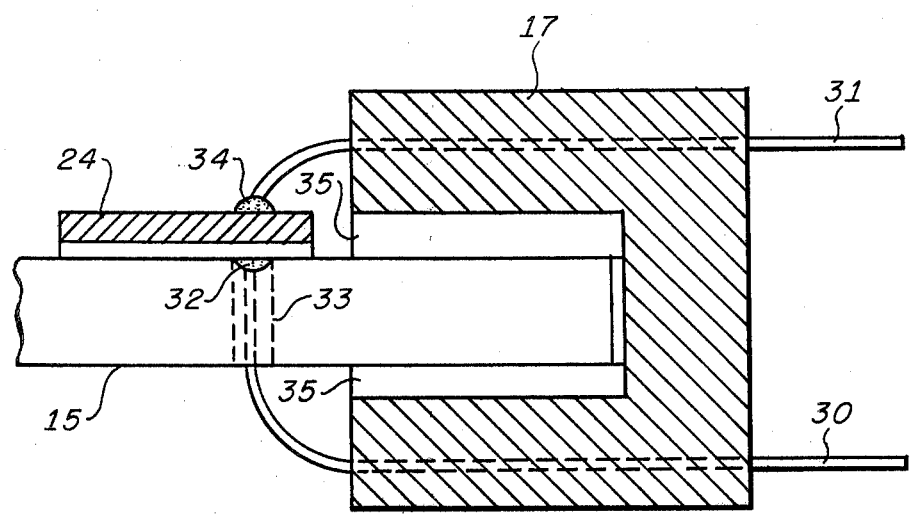
FIG. 3 is an enlarged plan view of a portion of the apparatus of FIG. 1.

Referring now to FIGS. 1 and 2, plan and sectional front views of a flow meter 10 are provided. The flow meter 10 includes a housing 11 and a channel 12 which is formed therein. Preferably, the housing 11 is made of aluminum bar stock or other suitable material and is sealed with a cover 21 which may be made of plexiglass or other suitable material. The cover 21 is secured by screws 20 which are threaded into the housing 11. The generally rectangular channel 12 is approximately 8" in length and includes an inlet 13 and an outlet 14 through which a continuous flow of fluid may be conducted. Disposed within the channel 12 is a flexible membrane 15 of a predetermined length X which is forced to occupy a predetermined length L of a portion of channel 12. The flexible membrane 15 is preferably fabricated from mylar or other suitable polymer, and in an alternate embodiment of the present invention it is fabricated from a piezoelectric polymer such as polyvinylidene fluoride $PVF_2$. Typically, the flexible membrane 15 has dimensions of approximately 0.005 inch thick, 13/16 inch wide, and 3 inches long. Moreover, the flexible membrane 15 is accurately dimensioned in width such that there is adequate clearance for free movement of the flexible membrane 15 inside the channel without excessive leakage flow. Forcing the flexible membrane 15 to assume length L in a portion of channel 12 results in a buckling of the flexible membrane 15.

The ends of the flexible membrane 15 are illustrated as being held by membrane holders 16, 17 which are slotted to allow the passage of fluid along the flexible membrane 15. A lead screw 18 may be threaded through the housing 11 and coupled to the membrane holder 17, such that the distance L between the membrane holders 16, 17 may be precisely adjusted. A set screw 22 may be threaded through the housing 11 to secure the membrane holder 16 within the channel 12. In the preferred embodiment at least two strips of piezoelectric polymer 24 are affixed to the flexible membrane 15 at known locations. It should be noted that in further embodiments of the present invention, strain gauges of the type having a resistive element whose output is proportional to the amount of deformation may be substituted for the strips of piezoelectric polymer 24. In still further embodiments of the invention the flexible membrane 15 itself may be fabricated from a piezoelectric polymer instead of affixing the strips of piezoelectric polymer 24.

Referring now to FIG. 3, an enlarged plan view depicts a strip of piezoelectric polymer 24 affixed to the flexible membrane 15. The piezoelectric polymer strip 24 is shown as being affixed to the flexible membrane 15 near the membrane holder 17. Preferably, the piezoelectric strip is fabricated from a piece of $PVF_2$ approximately 0.001" thick which is metallized on both sides. $PVF_2$ having a sputtered metal coating is a commercially procurable product. A wire lead 30 is attached to the metallized piezoelectric strip 24 by a bead of conductive epoxy 32. A hole 33 approximately 1/16" in diameter is drilled into the flexible membrane 15 which is epoxied to the membrane holder 17 by layers of epoxy 35. The wire lead 30 is then fed through the hole 33 and nonconductive epoxy is used to affix the metallized piezoelectric strip 24 to the flexible membrane 15. A second wire lead 31 is attached to the metallized piezoelectric strip 24 by a bead of conductive epoxy 34. The wire leads 30, 31 are epoxied to the membrane holder 17 and attached to pins 19, 19' disposed in the plexiglass cover 21.

Figure 4:
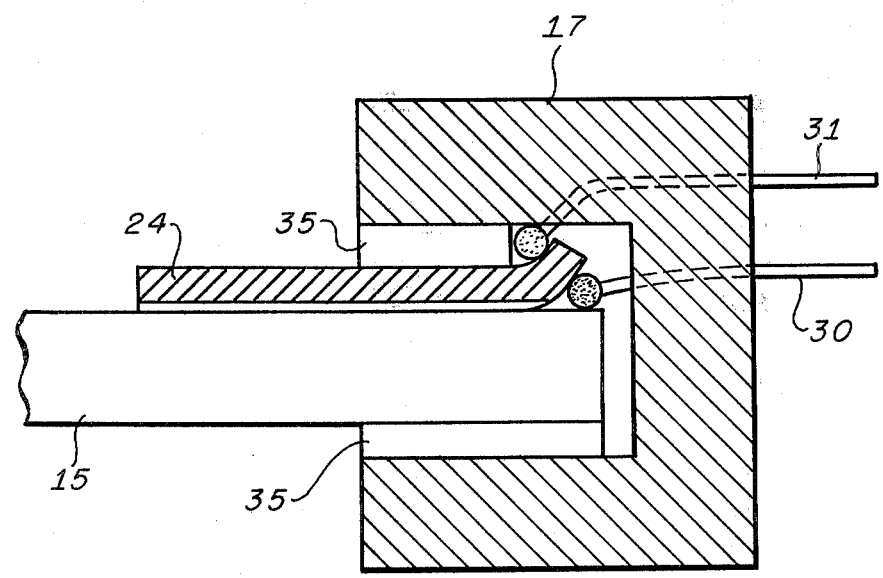
FIG. 4 is an alternate embodiment of the apparatus of FIG. 3.

Referring now to FIG. 4, an alternate technique for affixing the piezoelectric polymer strip 24 to the flexible membrane 15 is illustrated. The membrane holder 17 is fabricated from a nonconductive material or the interior portion is covered with an insulating material. The wire leads 30, 31 are epoxied to both sides of the metallized piezoelectric polymer strip 24. The flexible membrane 15 and the metallized piezoelectric polymer strip are epoxied together as well as the membrane holder 17 by layers of epoxy 35. Wire leads 30,31 are also epoxied to the membrane holder 17.

Figure 5A:
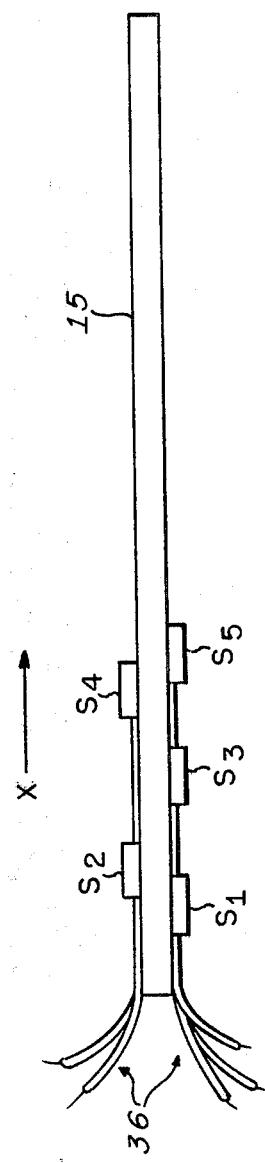
FIGS. 5a and 5b depict a flexible membrane included in the apparatus of the present invention.
Figure 5B:
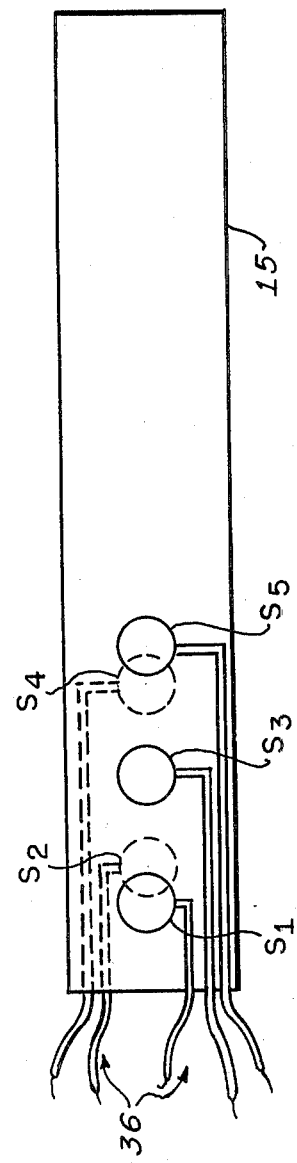

Referring now to FIGS. 5a, and 5b, plan and front views illustrate the flexible membrane 15 in a flattened and extended disposition. Illustrating the flexible membrane 15 in this disposition is useful in explaining an alternate embodiment of the present invention and useful in explaining the relationship of known points on the flexible membrane 15. An alternate embodiment of the present invention may be realized by fabricating the entire flexible membrane 15 from the piezoelectric polymer $PVF_2$. In known locations on the flexible membrane 15, for example, $S_1, S_2, \ldots S_j$, the piezoelectric polymer is metallized. It should be noted that when the flexible membrane 15 is undulating in a traveling wave type of displacement inside channel 12, locations $S_1, S_2, \ldots S_j$ on the flexible membrane 15 are displaced in a direction substantially traverse to the X axis which is parallel to the direction of fluid flow. Accordingly, when the flexible membrane is undulating the distance between any two known locations $S_i$ and $S_j$ may be designated as $\Delta X_{ij}$, a substantially constant known distance. Electrical output signals may be generated by attaching wire leads to each of the metallized locations $S_1, S_2, S_3, S_4, S_5$ on the piezoelectric flexible membrane 15 in FIG. 5.

Figure 6:
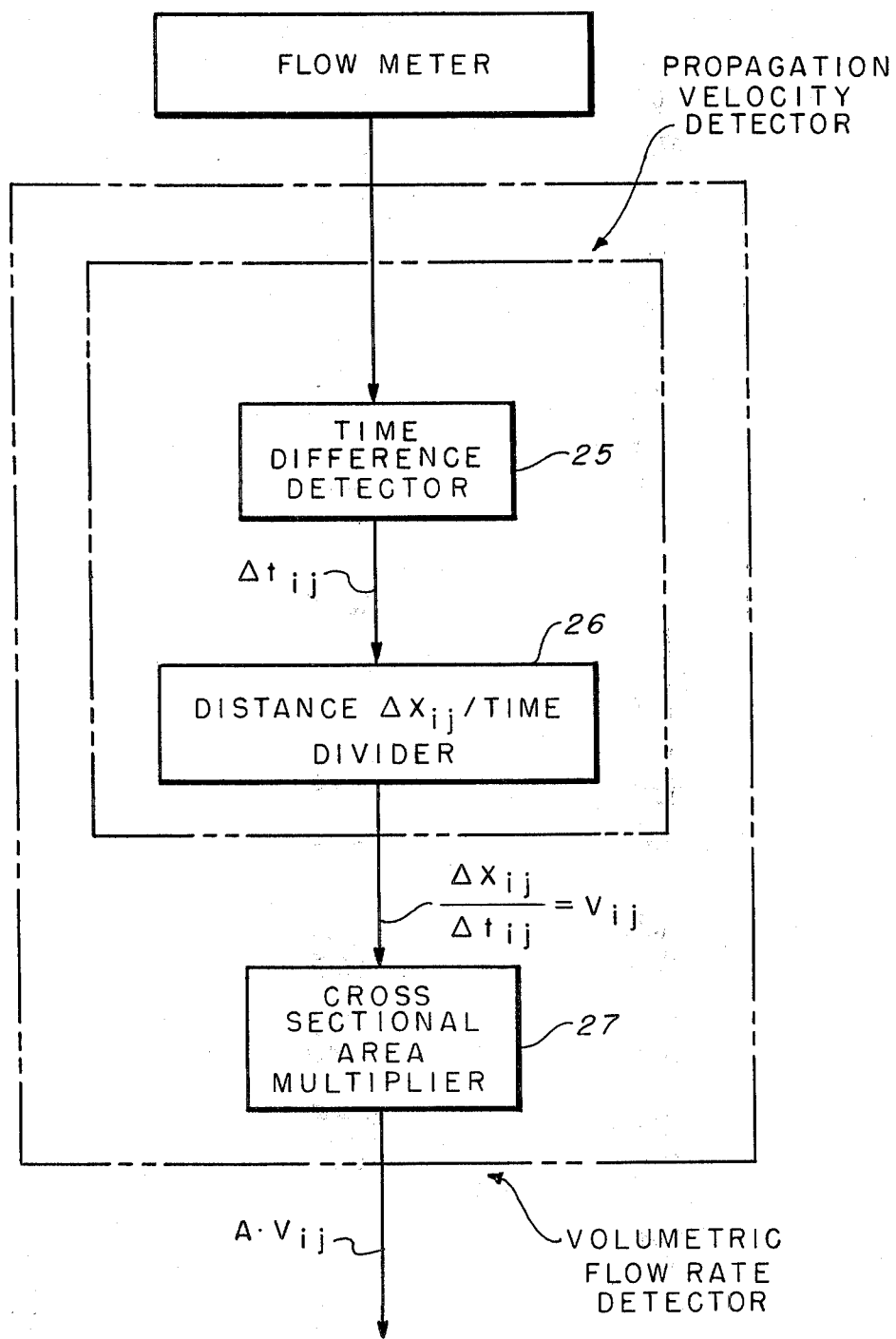
FIG. 6 is a block diagram of a propagation velocity and volumetric flow rate computer.

Referring back to FIG. 1, it can be appreciated that in the preferred embodiment of the present invention there are two piezoelectric polymer strips 24 separated by a substantially constant distance $\Delta X$. In operation, when the flexible membrane undulates, the piezoelectric polymer strips 24 are subject to alternating tension and compression forces which generate a pair of output signals at the output terminals or pins 19, 19'. The output signals have a generally sinusoidal waveform. The peak to peak time difference $\Delta t_{ij}$ between the two generally sinusoidal waveforms or the phase difference therebetween are proportional to the time required for the traveling wave to propagate the distance $\Delta X_{ij}$, i.e., the known distance between piezoelectric polymer strips 24. Referring to FIG. 6, since the distance $\Delta X_{ij}$ is known and since the time difference $\Delta t_{ij}$ may be measured with electronic time difference detector 25, the velocity of propagation between points $S_i$ and $S_j$ may be computed by divider 26 using the equation $V_{ij}=\Delta X_{ij}\Delta/T_{ij}$. The traveling wave flow meter is a positive displacement type of flow meter, and the average velocity of fluid flow is equal to the velocity of propagation of the traveling wave, i.e., $V_{ave}=V_{ij}$. It is well known that volumetric flow rate Q can be computed from the equation $V_{ave}=Q/A$, where A is the cross sectional area of the channel 12. Thus, the volumetric flow through the channel 12 may be computed by cross sectional area multiplier 27 from the equation $Q=A\Delta X_{ij}/\Delta t_{ij}$.

Accordingly, it should be appreciated that the response time of the traveling wave flow meter can be made considerably faster by using the velocity of propagation rather than by using the frequency of the undulating flexible membrane to compute the volumetric flow as disclosed in copending application Ser. No. 210,088. It should be further appreciated that by increasing the number of known locations on the flexible membrane at which an output signal is generated the response time of the traveling wave flow meter may be made even faster. For example, if the number of known locations is doubled from two to four, then the response time can be cut in half.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A positive displacement flow meter comprising:
   means for conducting fluid;
   flexure means for undulating in response to fluid flow within said conducting means; and
   means for detecting the velocity of propagation of a traveling wave associated with said undulating flexure means.

2. An apparatus according to claim 1 wherein said velocity detecting means includes means for generating output signals at a plurality of known locations on said flexure means.

3. An apparatus according to claim 2 wherein said means for generating output signals includes at least two metallized polymer piezoelectric strips affixed to said flexure means and having output leads coupled thereto.

4. An apparatus according to claim 3 wherein said polymer piezoelectric strips are affixed to means for holding said flexure means.

5. An apparatus according to claim 2 wherein said velocity detecting means includes strain gauges.

6. An apparatus according to claim 1 wherein said flexure means includes a flexible membrane of piezoelectric polymer material having known metallized locations thereon and having output leads coupled to said metallized locations.

7. An apparatus according to claim 3, 4, 5 or 6 wherein said velocity detecting means includes means for determining time $\Delta t_{ij}$ for traveling waves to propagate a distance $\Delta X_{ij}$ between known locations, and means for determining velocity $V_{ij}=\Delta X_{ij}/\Delta t_{ij}$.

8. An apparatus according to claim 7 which further includes means for providing flow rates which are proportional to the detected velocity $V_{ij}$.

* * * * *